United States Patent Office 3,356,997
Patented Dec. 5, 1967

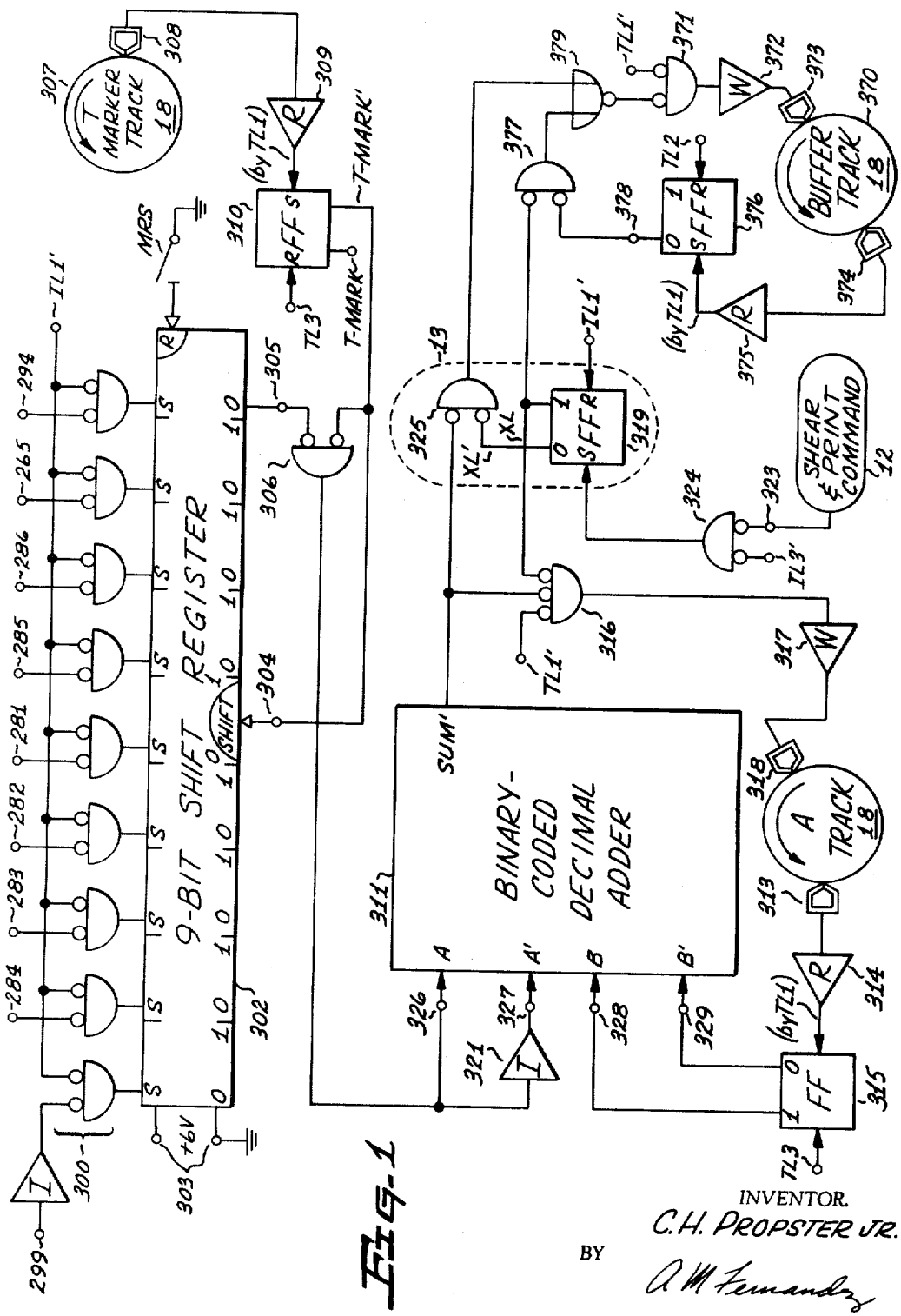

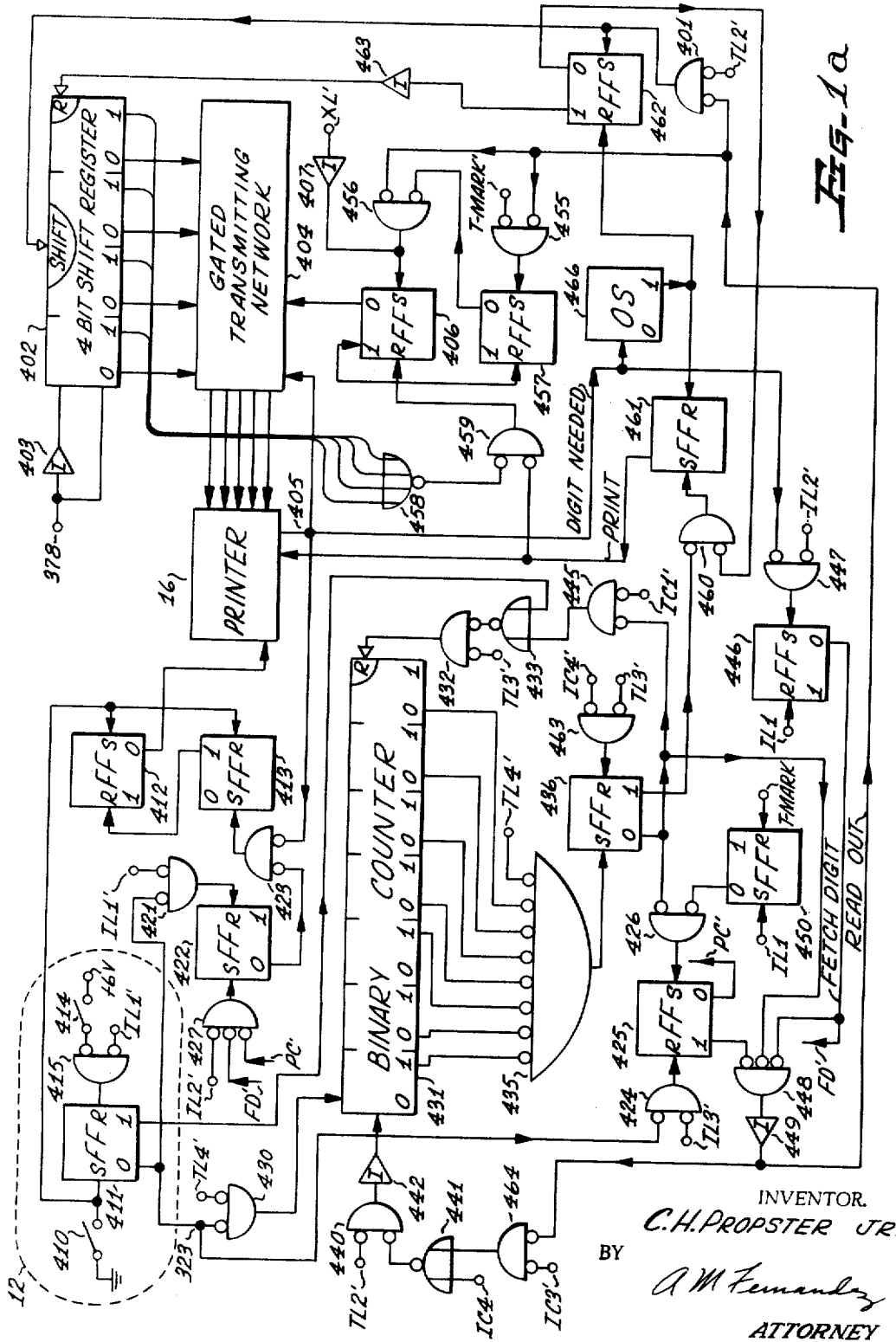

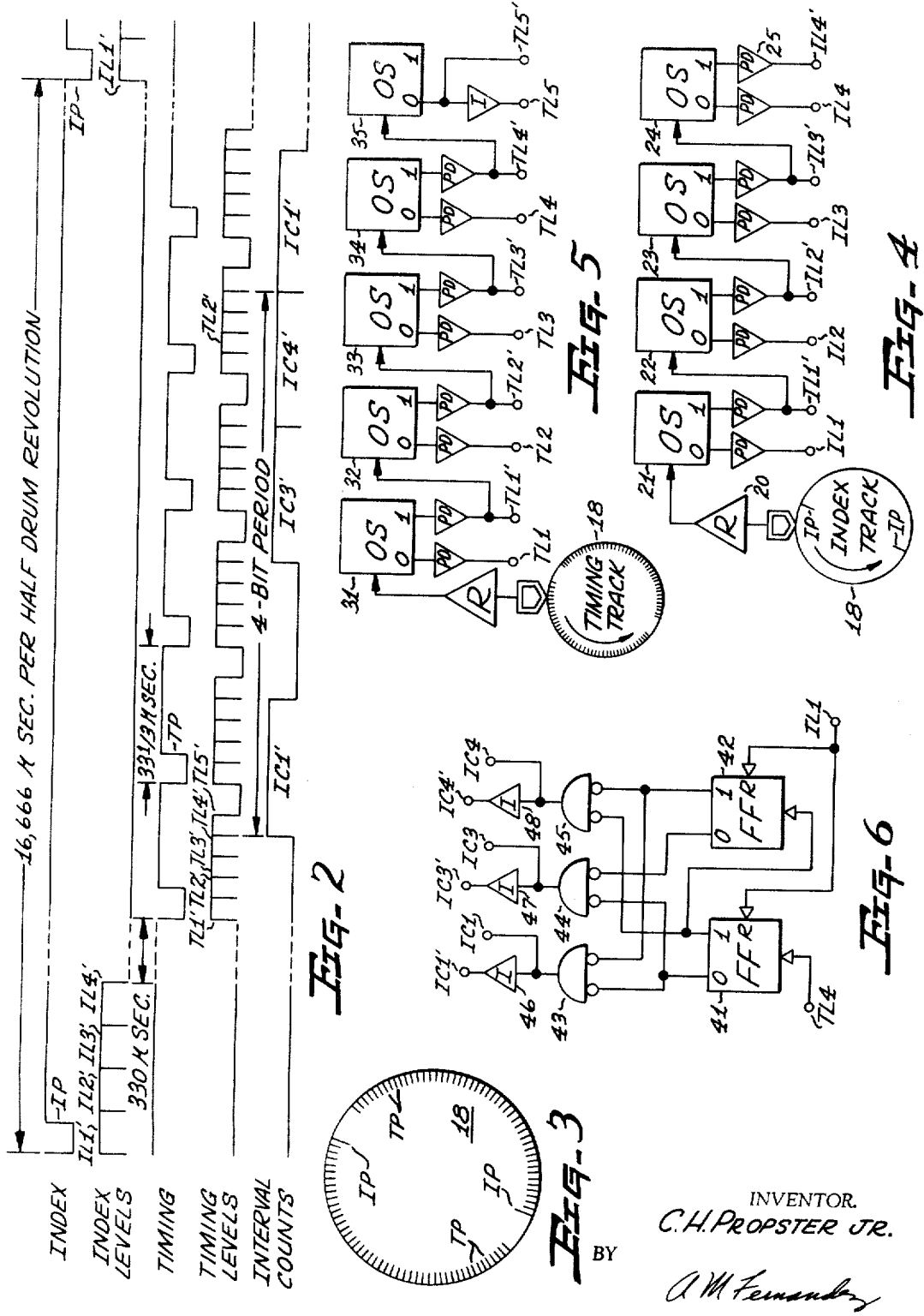

3,356,997
PRINT-OUT CONTROL SYSTEMS
Charles H. Propster, Jr., San Jose, Calif., assignor to General Electric Company, a corporation of New York
Continuation of application Ser. No. 204,698, June 25, 1962, which is a division of application Ser. No. 849,002, Oct. 27, 1959, now Patent No. 3,093,730, dated June 11, 1963. This application June 21, 1966, Ser. No. 559,342
10 Claims. (Cl. 340—172.5)

ABSTRACT OF THE DISCLOSURE

Control apparatus for transmitting digits stored in a memory device in a predetermined order to a utilization device in the inverse order. A counter is incremented as successive storage locations containing digits of successively increasing orders of significance are scanned, a digit of predetermined significance being transferred to the utilization means as its corresponding storage location is identified by a predetermined count in the counter. Logic circuitry resets the counter after each transfer and provides an extra incrementation so that the predetermined count is reached as memory locations containing successively lower-order digits are scanned, permitting transfer of digits of successively lower significance to the utilization device.

---

This application is a continuation of application Serial Number 204,698, filed June 25, 1962 and now abandoned, which application is a division of application Serial Number 849,002, filed October 27, 1959, and issued June 11, 1963 as patent 3,093,730.

This invention pertains to a print-out control system and, more particularly, to a control system for presenting groups of numerical characters stored on a rotating magnetic medium to a printer in such a manner that, although the characters in a given group which represent numerical data are accessible in increasing order of significance, the characters are printed out in decreasing order of significance in order that all characters of each group may be sequentially printed on a line in decreasing order of significance and all zeroes in orders of higher significance than the most significant non-zero character of a group may be suppressed.

In data accumulating systems and other similar data processing systems utilizing a magnetic drum, or other types of recirculating memory devices, it is convenient to store numerical data in series beginning with the least significant character of a group representing a number in order that the data may be read out and processed in a serial manner and in increasing order of significance, thereby facilitating the propagation of binary and decimal carries. However, upon printing out data stored and processed in that manner, it is desirable to read out and print groups of characters representing numbers in inverse sequential order in order that a typewriter, or other recording device, may be employed to print the numbers on a line in successive spaces from left to right. That is desirable in order to avoid the complex electromechanical control otherwise necessary to print characters in sequential order from right to left and in order to facilitate the suppression of all zero characters of a group representing numbers that are in numerical orders of greater significance than the most significant nonzero character.

Accordingly, it is an object of this invention to provide a novel control system for printing out numerical data stored in a recirculating memory device, such as a rotating magnetic drum.

It is another object of this invention to provide an improved data output control system.

It is a further object of this invention to provide a control system for transmitting information stored in a memory device in a predetermined order to a utilization means in the inverse order.

As described in U.S. Patent 3,093,730, issued June 11, 1963 and assigned to the assignee of the present invention, inspection data from a plurality of sensors displaced along a tinplate inspection line may be accumulated and printed on a permanent record through a plurality of synchronizing channels, one channel for each different type of inspection data. Certain channels include a delay element between its associated sensor and accumulator to compensate for the distance the sensor is displaced from a reference point along the inspection line in order that all inspection data accumulated at a given time pertain to the same item, or foot of tinplate, inspected at different times.

A single rotating magnetic drum provides all of the binary storage required to implement both the shift registers employed as delay elements and the accumulating registers. Only a small amount of additional binary storage is necessary for the control circuits of each type of register. That additional binary storage is relatively small as only one control circuit is provided for all of the registers of each type. This economic use of control circuits is accomplished through a time-sharing technique made feasible by organizing the drum into equal parts such that at least one operating cycle is provided for each register during each drum revolution.

Data recorded on part of a track on the magnetic drum is read out in series and immediately re-recorded in corresponding cells of another part of the track. Part of a drum cycle later, the data is re-read and transferred back to the first part. Thus, the data is continually transferred between the equal parts of the track. Each time the data is transferred, it may undergo some operation; therefore, a system implemented in such a manner may perform as many as two operations during one drum revolution or cycle. The operation is a shift operation in the case of the shift registers implemented on one track and an arithmetic operation for the accumulating registers implemented on another track.

At the conclusion of a data accumulating period, such as at the end of the inspection of a given coil of tinplate, the inspection data is transferred to a plurality of buffer registers, each buffer register corresponding to an accumulating register and being implemented on a track of a rotating magnetic drum in a similar manner as the corresponding accumulating registers. Therefore, the inspection data is read out and printed sequentially beginning with the most significant character of the last buffer register read during a given one-half of a drum cycle until all of the data transferred into all of the buffer registers has been printed out.

All of the data is printed on a sheet of paper from left to right in a single line so that the most significant character of each group of characters read from successive buffer registers appears on the left of each group. As the characters of a given group are sequentially read out for printing, a control flip-flop is set to inhibit the printing of each successive character until a nonzero character is read in response to which the control flip-flop is reset to allow that nonzero character and all of the remaining characters of the group to be printed.

In accordance with the invention, the sequential printing of digits in the order of most-significant to least-significant is effected under control of a counter which is incremented by one as each sector of a drum track storing a digit is scanned by a transducer. The counter commences from an initial count of one so that a predetermined count is reached as the transducer is scanning the sector immediately preceding the one containing the most-significant digit. At this time, if the utilization device is not ready to receive a digit, the counter is reset and again incremented by one for each sector scanned, commencing with the sector containing the most-significant digit. If the utilization device is ready to receive a digit, the digit is transferred and the counter receives an extra incrementation while scanning the sector containing the most-significant digit, causing the counter to have a count of two upon completion of scanning of the sector containing the most-significant digit. Thus, the predetermined count will next be reached while the transducer is scanning the sector preceding the one containing the next most-significant digit. In this manner, the addressing of the sectors continues in inverse order from most-significant to least-significant by providing an extra incrementation of the counter each time a digit is transferred to the utilization device.

The subject matter of the invention is particularly pointed out and distinctly claimed in the concluding portion of the specification. The invention, however, both as to organization and method of operation may best be understood by reference to the following description taken in connection with the accompanying drawings, in which:

FIG. 1 is a schematic diagram of the accumulating and output buffer sections in a data accumulating system having a plurality of accumulators and corresponding output buffer registers implemented on tracks of a rotating magnetic medium;

FIG. 1a is a schematic diagram of the print-out control section;

FIG. 2 is a timing diagram of synchronizing pulses;

FIG. 3 illustrates schematically the physical location of recorded timing pulses in each sector with respect to recorded index pulses which define the sectors; and FIGS. 4, 5 and 6 illustrate schematically the manner in which the synchronizing pulses of FIG. 2 may be obtained.

For a detailed description of the complete data accumulating system of which the present invention is a component part, reference is made to the aforementioned co-pending application, Serial No. 849,002, from which the present application has been divided.

Circuit elements

Before proceeding with a detailed descriptoin of an embodiment of the invention, circuits which may be used to implement that embodiment will first be generally described. For a detailed description and diagrams of those circuits, reference is made to the aforementioned copending application. The basic module or building block from which almost all of the circuits of the invention may be constructed consists of a NOR-circuit comprising a common-emitter transistor amplifier that is useful not only as an inverter and as an active element in transistor monostable multivibrators or one-shots and bistable multivibrators or flip-flops but also to provide the logic AND and OR functoins. The logic functions are provided with a NOR-circuit by coupling an input terminal to the base of the transistor by impedance elements so that only when both input signals are negative with respect to the emitter bias will the transistor amplifier conduct. If the emitter is connected to a bias source of +6 volts, a logic level of +6 volts for the output signals is established. That +6 volt level may be arbitrarily defined as a binary 0.

The collector of the transistor is connected to an output terminal which is clamped to ground by a diode so that a second logic level of 0 volt defined as a binary 1 is established. Accordingly, when two input signals A and B are both +6 volts, the signal at the output terminal is 0 volt. A Boolean equation for that logic AND function may be written as $A'B'=C$. Since the output of the NOR-circuit employed as an AND-gate is changed from a bit 0 to a bit 1 only in response to a +6 volt signal at both input terminals, to obtain the logic AND function of any set of signals X and Y, the binary complements $\bar{X}$ and $\bar{Y}$ are used as the input signals.

As noted hereinbefore, the NOR-circuit is also used as an OR-gate and as an inverter. For the logical OR function, both input terminals are normally at +6 volts to hold the transistor cut off; the output terminal is then normally at 0 volt. If either input terminal is driven to 0 volt, the transistor conducts at saturation and the potential of the output terminal is driven to +6 volts. Thus, the output of the OR-gate is changed from a bit 1 to a bit 0 in response to a bit 1 signal in either input terminal. The logic OR operation may be written as $A+B=\bar{C}$. Accordingly, the OR-gate operates on any set of signals X and Y to provide as an output signal a bit 0 if either X or Y is a bit 1. If only one input terminal is used, the logic element functions simply as an inverter.

A flip-flop may be implemented by cross-coupling the output terminals of two NOR-circuits with their input terminals. A one-shot circuit may be similarly implemented by using only a capacitor for the cross-coupling element from the output terminal of one NOR-circuit to the input terminal of the other.

It should be understood that these and other circuits employed, such as power-drivers, write amplifiers and read omplifiers, may be implemented with other conventional circuit configurations as long as it is understood that allowance should be made for the inherent inverting function of each NOR-circuit employed as either an AND-gate or an OR-gate if a logic gate of a circuit configuration not inherently providing inversion is employed.

In the drawings, the AND-gate is represented by a half circle having input terminals coupled to it by small circles which represent the inherent inverting function of the NOR-circuit when employed to provide the logic function $A'B'=C$. The OR-gate is represented by a half circle having input terminals running through it and an output terminal coupled to it by a small circle which represents the inherent inverting function of the NOR-circuit when employed to provide the logic function $A+B=\bar{C}$. The other circuits are represented by block symbols bearing brief or abbreviated legends.

General description

Three transducers or detectors (not shown) are provided for sensing defects in tinplate as it is inspected and wound into a coil by means also not shown. They are displaced from each other such that each inspects a different foot at a given time. Each defect, such as a pinhole, overgauge or undergauge, produces a pulse signal in a corresponding detector which is fed to a data input control circuit.

To coordinate all of the inspection data with respect to a given foot, the inspection data from each detector is so delayed in a delay section that all of the data pertaining to that given foot is fed to an accumulating section at the same time. The delay section consists of the data input control section and a plurality of drum shift regitser channels. Each drum shift register channel receives its corresponding data and transfers it through a plurality of binary storage cells, one cell at a time, in response to TACH pulses until the desired delay has been introduced.

The TACH pulse source may be a tachometer driven by the tinplate and modified to generate a pulse for each linear foot of tinplate that passes over it. Accordingly, the transfer of data through a drum shift register is controlled by TACH pulses and proceeds at the same rate that the tinplate is inspected. For instance, if the detectors are respectively twenty-five, twenty-three and seventeen feet away from a shearing station, and if the data from the detectors is transferred through corresponding shift register channels having twenty-five, twenty-three and seventeen cells, respectively, all of the data transferred out of the shift register channels at any given time must pertain to the same foot of tinplate and that particular foot will at that time have just passed the shearing station regardless of the tinplate speed.

Under normal operation, the tinplate is inspected at a relatively constant rate so that the TACH pulses are generated at a substantially constant rate. However, when the tinplate coil is separated from the line, the tinplate is decelerated, sheared and then accelerated by a control means not shown with the result that the TACH pulse repetitioin rate is first decreased and then increased to normal again. Since the delay introduced by each drum shift register channel is controlled by TACH pulses, the delay through each channel is in terms of feet of tinplate inspected and the fact that the speed of the tinplate varies is not important.

The accumulating section to which the coordinated data from the delay section is fed consists of an accumulator input control circuit and a plurality of drum accumulators, one accumulator for each type of data to be accumulated. The transfer of data from the drum shift register channels to the drum accumulators is accomplished through the data input control circuit and the accumulator input control circuit.

In transferring the inspection data from the delay section to the accumulating section, the coordinated data may be processed to develop other useful data to be accumulated. In the instant embodiment, all of the data pertaining to a given foot is processed by a logic circuit to determine whether any defects were detected. If there were none, a signal is developed indicating that the given foot is prime or first in quality. All of the prime-foot signals are accumulated in the same manner as other data to provide the total number of prime feet in the coil as part of the information record.

It may not be necessary to coordinate all of the data in certain applications. Data which does not need to be coordinated is transferred directly through the data input control circuit and the accumulator input control circuit. In the instant embodiment, the total number of feet inspected and the total number of pinholes detected in the coil are not coordinated. The total-feet data which is obtained by accumulating TACH pulses does not need to be coordinated since every foot of tinplate is the same for the purpose of obtaining total footage.

The total-pinhole data is obtained by first counting pinhole defect signals in the data input control circuit for each foot of tinplate inspected and then accumulating the pinhole count for every foot inspected. If an exact total pinhole count is desired for each coil, the pinhole count data should also be coordinated in the same manner as other inspection data.

When a shear command is received from a source external to the system, a transfer switch is actuated and all of the data in the drum accumulators is transferred to a buffer section which includes a drum buffer and a data print control section. The drum buffer stores the accumulated data pertaining to the coil just sheared from the line until the data print control section calls for it to be printed out, one digit at a time, at a rate determined by a printer.

The drum shift register channels, drum accumulators and drum buffer 14 are all implemented on a band of tracks on a magnetic drum so that only one source of synchronizing pulses is necessary for the proper timing of the operations in each section of the system. The source of synchronizing pulses is also implemented on the band of tracks in a conventional manner.

Timing

FIG. 2 is a timing diagram of the synchronizing pulses. The first graph is of the negative-going (+6 to 0 volts) index pulses IP, two of which are oppositely written on a single track of the drum 18 (FIGS. 3 and 4) to separate it into two equal parts. Although in this embodiment the drum 18 is divided into only two equal parts, it should be understood that the drum may be organized into any number of equal parts, by simply providing additional index pulses. For instance, the drum could be separated into three equal parts. Data read from one part would immediately be written in the next part. One third of a drum cycle later, the data would be reread and rewritten in the third part. In that way three operations could be performed in one drum cycle.

The third graph is of the negative-going (+6 to 0 volts) timing pulses TP which are written on another track of the drum 18 (FIGS. 3 and 5). They separate each half of the drum between the index pulses into very small sectors, each sector constituting a single binary storage cell in a manner well known in the art. It should be noted from the graphs of FIG. 2 and from the diagram of FIG. 3 that a blank space is left between each index pulse IP and the first timing pulse TP following it. In the illustrated example that space is about 370 microseconds. The reason for it is to allow more than sufficient time for data to be transferred between sections of the system in synchronism with an index pulse before operations within the sections commence and to provide at least one blank timing pulse period (33⅓ microseconds). Thus, if desired, that blank space may be reduced to forty microseconds for the time needed to transfer data between sections plus one timing pulse period.

In order to precisely control the transfer of data between sections and to accurately time operations within a given sections, several levels of indexing and timing are provided by four index level pulses, each ten microseconds long, and five timing level pulses, each five microseconds long.

The second graph of FIG. 2 is of the index level pulses derived from a circuit shown in FIG. 4 in response to an index pulse from a read amplifier 20. That circuit consists of four monostable multivibrators 21 to 24 cascade coupled through power-drivers 25. Each produces a ten microseconds pulse. Since the power-drivers function not only to provide sufficient power to drive a large number of logic circuits in parallel but also to invert the pulses, the IL1' to IL4' pulses shown in the second graph of FIG. 2 are actually derived from terminals coupled to the "true" or 1-output sides of the monostable multivibrators. Similarly, the true signals IL1 to IL4 are derived from terminals coupled to the "false" or 0-output sides of the monostable multivibrators.

In a similar manner the timing pulses TP generate the timing level pulses TL1' to TL5' as illustrated in the fourth graph of FIG. 2 through five cascaded monostable multivibrators 31 to 35 as shown in FIG. 5. As noted hereinbefore, each timing level pulse is five microseconds long.

The reason for designating the positive-going (0 to +6 volts) pulses with a prime, such as the IL1' and TL1' pulses, is that a voltage level of +6 volts is used to represent a bit 0 and a voltage level of 0 volt is used to represent a bit 1 in the logic of the system to be described. Accordingly, IL1' is to be read as *not* IL1 while *not* IL1', which should be written as $\overline{IL1'}$, is to be read as IL1. To avoid confusion, the double negative notation will not be used; instead, its corresponding positive notation is used. However, the inverted or "not" form of a signal obtained from the "false" side of a flip-flop or monostable multivibrator or from the "true" side through an inverter will very frequently be used.

The pulses in the last graph of FIG. 2 are derived from an interval counter schematically illustrated in FIG. 6. It consists of two cascaded binary circuits 41 and 42 which count the end of each TL4 pulse and which are reset by each IL1 pulse. The function of the interval counter is to separate the binary cells of each half of the drum into digit groups. Each digit group includes four timing periods, each period having a duration from the end of one TL4 pulse to the end of the next TL4 pulse. The number of periods in the group has been arbitrarily selected so that each group may store one four-bit binary-coded decimal digit. A signal corresponding to each of the interval count periods, IC1 to IC4, except the second, IC2, is obtained from a decoder consisting of three logic AND-gates 43, 44 and 45. Inverters 46, 47 and 48 connected to the output terminals of the AND-gates provide the IC1', IC3' and IC4' pulses of FIG. 2.

The sources of these index level, timing level and interval count pulses will not be referred to again. Instead, input terminals which are to be connected to particular ones of the output terminals of the circuits in FIGS. 4, 5 and 6 will be indicated by legends.

In addition to the index level and timing level synchronizing pulses, other control signals are obtained from other tracks on the drum. The manner in which those control signals are derived will be described hereinafter with reference to FIG. 1.

ACCUMULATING SECTION

General

An IL1' pulse gates the inspection data from the delay section (not shown) to the accumulating section illustrated in FIG. 1. Data transferred to the accommulating section is added during the following half drum cycle to data previously accumulated. For instance, a bit 1 denoting that a given type of defect was detected is added to a previous total in a given accumulator. In the instant embodiment, there are six data accumulators, one for the total pinhole count, one each for the total number of feet having one of three different types of defects, one for the total number of feet inspected and one for the total number of prime feet. The accumulating process is repeated during each half cycle. However, each IL1' pulse gates only zero bits into the accumulator section except those IL1' pulses which follow a shift operation in the delay section because only then is there any data being stored in the output shift register and buffer flip-flops of that section.

Accumulator input control

The data from the delay section is gated to the accumulating section through a bank of AND-gates 300. The output terminals of the delay section are connected to the input terminals of the AND-gates 300 as follows: The total pinhole count to terminals 281 to 284; the delayed inspection data to terminals 285, 286 and 265; the bit 1 which represents that a foot of tinplate has been inspected to terminal 294; and the bit which denotes whether the foot to which the inspection data at terminals 285, 286 and 265 pertains is prime to terminal 299. The terminal 299 is coupled to one of the AND-gates 300 through an inverter 301 to obtain the complement of the prime-foot data since the logic AND-gate requires the complement or inverted form of the signals to be combined and the prime-foot data, unlike the rest of the inspection data, is not presented to the accumulator section of FIG. 1 in a complemented form.

Each of the output terminals of the AND-gates 300 is connected to a set input terminal of a different stage of a nine-bit shift register 302. A pair of serial-input terminals 303 are connected to a bit-0 source illustrated by a +6 volt signal source. Each pulse applied to the shift control terminal 304 of the shift register 302 advances the stored data one place to the right in order that each bit of the data transferred in parallel into the shift register may be read out serially through an output terminal 305. As each of the nine bits of data is serially read out, a bit 0 from the serial input terminals 300 is shifted into the shift register. Consequently, as data is serially shifted into the accumulators through an AND-gate 306 connected to the output terminal 305, the shift register is reset. A manually operated reset switch MRS connected to the reset input terminal of the shift register may be momentarily closed to initially reset the shift register.

The data serially read out through the output terminal 305 is gated through the AND-gate 306 by T-MARK' pulses which are generated in response to T-marker pulses recorded on a track 307 of the drum 18. Those pulses are read by a transducer 308 and translated by an amplifier 309 to a flip-flop 310 prior to the time of a TL1 pulse. In that way the flip-flop 310 is set by the time of the leading edge of a TL1 pulse and reset by the leading edge of a TL3 pulse applied to its reset input terminal.

The T-MARK' signals from the false output terminal of the flip-flop gates the signals from the output terminal 305 to a binary-coded decimal adder 311 time-shared by the drum accumulators. The T-MARK' pulses are also applied to the shift control terminal 304 of the shift register 302 but since the T-MARK' pulses are positive going (0 to +6 volts), the data in the shift register is not advanced until the negative-going (+6 to 0 volts) trailing edges of the T-MARK' pulses are received since the shift register requires negative-going shift control signals. Accordingly, the serial output signal of the shift register is presented to the binary adder 311 from prior to the time of the leading edge of a TL1 pulse to the time of the leading edge of the next TL3 pulse. Then the flip-flop 310 is reset, the AND-gate 306 is disabled, and the data in the shift register is shifted one place to the right.

In the present embodiment, there are nine T-marker pulses recorded on the track 307, one for each of the nine bits in the shift register. The nine T-MARK' pulses T1 to T9 time or mark particular binary cells in an accumulator track 312. Those cells are the first cells of the six accumulators and the second, third and fourth cells of the fifth accumulator. The following chart graphically illustrates the timing of the T-MARK' pulses T1 to T9.

FIRST ACCUMULATOR

→ /1 0 0 0 /0 0 0 0 /0 0 0 0 /0 0 0 0
   T1

SECOND ACCUMULATOR

→ /0 1 0 0 /0 0 0 0 /0 0 0 0 /0 0 0 0
   T2

THIRD ACCUMULATOR

→ /1 1 0 0 /0 0 0 0 /0 0 0 0 /0 0 0 0
   T3

FOURTH ACCUMULATOR

→ /0 0 1 0 /0 0 0 0 /0 0 0 0 /0 0 0 0
   T4

FIFTH ACCUMULATOR

→ /0 0 0 1 /1 0 0 1 /1 0 1 0 /0 0 0 0
   T5 T6 T7 T8

SIXTH ACCUMULATOR

→ /0 0 0 0 /0 0 0 0 /0 1 1 0 /0 0 0 0
   T9

In the foregoing chart, the cells of the six accumulators are graphically illustrated in separate lines, but on the drum they would be in one continuous line or track. Each cell is indicated by either a bit 0 or a bit 1. The cells are separated into groups of four by bars which, of course, are not present on the drum. In the present embodiment, the cells are actually grouped by the interval counter described with reference to FIG. 6. The interval-count signals derived therefrom are utilized in the binary adder 311 and the data print control circuit of FIG. 1a to separate the bits sequentially read from cells on the drum into four-bit binary-coded decimal digits. For instance, the total pinhole count in the fifth accumulator is illustrated in the cart as 0598 in binary-coded decimal form. The least significant digit 8 is stored in the first four cells on the left of the fifth accumulator and the digit 0 in the most significant decimal order of that number is stored in the last four cells on the right. Of each group of four cells, the first cell on the left stores the least significant binary digit. The data is stored in the accumulator in that order so that the least significant bit of the least significant digit of each accumulator is always read first as the cells are scanned (from left to right in the chart). That is necessary because the binary adder must operate on the binary digits of each decimal digit and of the successive decimal digits in the order of their increasing significance in order that binary carries may be propagated within groups of four cells and decimal carries may be propagated between groups of four cells.

The function of each of the T-MARK' pulses T1 to T9 illustrated in the foregoing chart is to gate one binary digit from the shift register 302 to its appropriate accumulator. The first, second, third, fourth and sixth accumulators have only one T-MARK' pulse each since they accumulate only unitary binary digits. The fifth accumulator, however, has four T-MARK' pulses T5 to T8 since it accumulates the total number of pinholes by adding four-bit binary-coded digits which represent the pinholes detected in successive feet of tinplate.

When the accumulated data is printed, in a manner to be more fully described with reference to FIG. 1a, the last digit of the sixth accumulator is read out, decoded and printed first because it is the most significant digit of that accumulator and it is desirable to print one digit at a time starting with the most significant digit of the last accumulator. Before that digit is read out, however, an XL' signal from the flip-flop 319 in the transfer switch 13 (FIG. 1) sets a zero-suppress circuit in FIG. 1a which prevents that digit from being printed if it is a zero, and prevents all subsequent digits from being printed until the first nonzero digit is read out and detected. The T9, T5, T4, T3 and T2 pulses are employed for the same purpose when the data from the fifth, fourth, third, second and first accumulators are read out and printed in that order. The T1 pulse is used in the print control circuit of FIG. 1a only to determine when all of the data has been printed.

*Drum accumulators*

The memory portion of each of the accumulators consists of a pair of sectors oppositely disposed on the track 312. In the present embodiment, each sector consists of sixteen binary cells which are separated into groups of four by interval-count pulses as described hereinbefore.

Referring again to the foregoing chart, it may be seen that the sectors in one half of the track are arranged in sequence for the six accumulators. The last four cells of the sixth accumulator comprise the last group of four cells on that half of the track before an IL1 pulse resets the interval counter (FIG. 6). The second half of the accumulator track 312 is identical to the first half.

Data stored in a given half of the track is read sequentially by a transducer 313 and a read amplifier 314. A buffer flip-flop 315 stores each bit from the amplifier 314 until it is reset by a TL3 pulse. In the interim, a bit stored in the buffer flip-flop is translated by the binary-coded decimal adder to an input terminal of an AND-gate 316 where it is gated by a TL1' pulse to a write amplifier 317 which records the gated bit on the track 312 through a recording transducer 318. In that manner, the data is transferred from one side of the track to the other twice during each drum revolution cycle until a flip-flop 319 is set to transfer the accumulated data to the buffer section for printing. The true output terminal of the flip-flop 319 is connected to an input terminal of the AND-gate 316 so that when it is set, the AND-gate 316 is inhibited.

The flip-flop 319 is set by a shear signal received at a terminal 323 from a shear and print command source 12 through an AND-gate 324 when a given coil inspected is sheared from the line. An IL3' pulse gates the shear signal through the AND-gate 324 to set the flip-flop 319 at the beginning of a half drum cycle. All of the data read from the track 312 on one side of the drum is then transmitted to the buffer section through an AND-gate 325 which is enabled by a +6 volt signal from the false side of the flip-flop 319. The flip-flop is reset at the beginning of the next half cycle by an IL1 pulse so that accumulation of data from the next coil may begin immediately.

While the data read from a given half of the track 312 is being transmitted through the AND-gate 325 in the transfer switch 13, the data in the other half of the drum is being erased since the write amplifiers 317 continually records a bit 0 except when it is triggered by a bit 1 transmitted through the AND-gate 316.

Data translated through the binary-coded decimal adder 311 is delayed therein four timing periods. Therefore, if the read head 313 were to be placed exactly opposite the write head, the data would be shifted or precessed through four binary cells during each half drum revolution. Accordingly, the write head 318 is slipped ahead in the direction of rotation through an arc equal to binary cells so that it records a bit of data on the track 312 in a cell opposite to the cell read by the read head 313. In that manner, data read by the head 313 may be translated to the write head 318 through a four-bit shift register in the binary adder 311 and recorded without it precessing around the drum with respect to the index pulses.

*Binary-coded decimal adder*

Each bit gated through the AND-gate 306 is fed directly to an input terminal 326 of the binary-coded decimal adder 311. Each gated bit is also transmitted through an inverter 321 to an input terminal 327. Hereafter, data fed to the terminal 326 will be referred to as the addend A and the data fed to the terminal 327 will be referred to as the complement A' of the addend.

Each four-bit binary-coded decimal digit read from the accumulator track 312 is fed to an input terminal 328 of the binary-coded decimal adder 311. The complement of each bit fed to that terminal is fed to another input terminal 329. Hereafter, data fed to the terminal 328 will be referred to as the augend B and the data fed to the terminal 329 will be referred to as the complement B' of the augend.

The output signal of the binary-coded decimal adder will be referred to as the sum, but it should be noted that each bit of the sum fed to the AND-gates 316 and 325 is the complement of the sum as denoted by the legend SUM'.

The manner in which the addend is added to the augend by the binary coded decimal adder 311 to provide a binary-coded decimal sum will now be described with reference to FIG. 7. In general, the addend is in binary-coded form but since it consists of either a unitary bit or a four-bit binary-coded decimal digit, the addend is always a binary-coded decimal digit. The augend is also in binary-coded decimal form because each digit of the augend translated through the adder is a four-bit, binary-coded decimal digit and the sum is converted to a binary-coded decimal form by the adder. For instance, if two four-bit, binary-coded decimal digits are added in the conventional binary manner, the sum may exceed nine, as when a seven is added to an eight to produce a four-bit binary-coded sum of fifteen which has no meaning in a binary-coded decimal system. When that occurs, the sum is converted to the decimal system by first inserting a carry in the augend's next higher order and then subtracting a binary ten from the forbidden sum, thereby obtaining the binary-coded decimal sum. A ten can be subtracted from the forbidden sum of fifteen by adding to it a binary six and ignoring the carry.

An example will clarify the foregoing converting process. Assume that the augend is 0598 and that the addend is seven. The conventional binary addition is as follows:

| | | | | |
|---|---|---|---|---|
| Carry (0) | 0000 | 0000 | 0000 | 000 |
| Augend | 0000 | 0101 | 1001 | 1000 |
| Addend | | | | 0111 |
| P-Sum | 0000 | 0101 | 1001 | 1111 |

The preliminary sum (P-Sum) of the addend and the least significant digit of the augend is a binary-coded fifteen, which is a forbidden sum. To convert the preliminary sum when the forbidden sum is detected, a carry may be inserted into the binary-coded nine of the next four binary digits and a six added to the binary-coded fifteen of the first four binary digits as follows:

| | | | | |
|---|---|---|---|---|
| Carry (0) | 0000 | 0000 | 0001 | 110 |
| P-Sum | 0000 | 0101 | 1001 | 1111 |
| Six | | | | 0110 |
| C-Sum | 0000 | 0101 | 1010 | 0101 |

In the corrected sum (C-Sum), the least significant digit has been corrected to a five and a carry inserted in the next most significant binary-coded decimal digit, thereby increasing it from nine to ten which, in a binary-coded decimal system, is also forbidden and again has no meaning. That the second digit has also exceeded nine may be detected and the process of converting the second four-bit binary-coded digit in the next order may be accomplished as follows:

| | | | | |
|---|---|---|---|---|
| Carry (0) | 0000 | 0011 | 110 | |
| C-Sum | 0000 | 0101 | 1010 | 0101 |
| Six | | | 0110 | |
| Sum | 0000 | 0110 | 0000 | 0101 |

In converting the second digit, the least significant digit 5 is not involved since it has already been stored but it has been written again to complete the final sum of 0605.

It should be noted that in the foregoing example the least significant bit of each binary-coded digit has been placed on the right and that a serial adder has been employed so that the binary-coded digits may be added and converted to the binary-coded decimal system in sequence.

In the binary-coded decimal adder illustrated in FIG. 7, the addend serially presented at terminals 326 and 327 is serially added to the augend serially presented at terminals 328 and 329. The complement of the final sum is then serially presented at an output terminal indicated by the legend SUM'.

The implmentation of the binary-coded decimal adder is illustrated in FIG. 6. It includes a first conventional full adder 330 to develop the sum of the addend and the augend, bit-by-bit, and to develop a carry signal whenever any two of the three input signals A, A'; B, B'; and C, C' are equal to a bit 1. A complement of the carry signal is gated by a TL2' to a buffer flip-flop 331 through an AND-gate 332. The output signal of the flip-flop 331 is transmitted to an AND-gate 333 through an OR-gate 334 until a TL1 pulse resets the flip-flop 31. A TL4' pulse gates the carry signal to a flip-flop 335 which then generates both a carry signal C and its complement C' until a TL3 pulse resets it.

The sum developed by the binary adder 330 is serially shifted into a four-bit shift register 340. Four successive TL2 pulses are therefore fed to its shift input terminal in order to shift the four-bit binary-coded sum into the shift register.

As noted hereinbefore, the sum from the binary adder 330 may exceed nine. Consequently, it is necessary to detect when a digit of the sum is any of the forbidden sums from ten to fifteen. A clocked AND-gate 341 is provided for that purpose. An IC4' clock pulse is required at one of its input terminals to insure that an output signal is not transmitted except when the four-bit sum to be checked has been properly stored in the shift register.

If a forbidden sum is present in the four-bit shift register during an IC4 interval, a TL4' pulse gates a signal through the AND-gate 333 to set the carry flip-flop 335, thereby inserting a bit 1 carry to be added to the next four-bit binary-coded decimal digit of the augend. The decoding logic to determine when there is a forbidden sum stored in the shift register 340 consists of a connection from the false side of the first stage to the AND-gate 341 and connections from the true sides of the second and third stages to a third input terminal of the AND-gate 341 through an OR-gate 342.

In that manner, a detected forbidden sum is partially corrected because a bit 1 carry has been inserted in the digit of the next higher decimal order. To complete the correction, a six must be added to the detected forbidden sum. This is accomplished by gating the complement of the carry signal from the flip-flop 335 through an AND-gate 343 with a TL2' pulse during the next IC1' interval to set a flip-flop 344. It should be noted that whereas all carries propagated by the first binary adder 330 set the carry flip-flop 335, it is only when the carry flip-flop 335 is set during an IC4 period that a carry signal C' is gated to the flip-flop 344 to add a six to the forbidden sum.

By the time the flip-flop 344 is set, the first bit of the forbidden sum will have been transmitted through a second binary adder 350 without alteration. In effect then, a bit 0 is added to the first bit fed to the binary adder 350 from the shift register 340. By the time the second bit of the forbidden sum is fed to the binary adder, the flip-flop 344 is set and a bit 1 is added to that second bit. The flip-flop 344 is not reset until a TL3' pulse gates an IC3' signal through an AND-gate 352. Therefore, a bit 1 is added to the third bit of the forbidden sum fed to the binary adder. The fourth bit of the forbidden sum is then fed to the binary adder after the flip-flop 344 is reset. Accordingly, the fourth bit is translated through the adder without alteration unless a carry signal was propagated by the binary adder 350 as a result of a bit being added to the third bit of the forbidden sum. In that manner a binary-coded six (0110) is added to the forbidden sum in order to subtract a ten and thereby correct the sum as explained hereinbefore.

Each carry propagated by the second binary adder 350 is gated through an AND-gate 353 by a TL1' pulse except during the IC4 count interval. During that interval, a 0 volt signal is present at a third input terminal of the AND-gate 353 which inhibits it from transmitting the carry signal being propagated from the most signifiicant bit order of one digit to the least significant bit order of the next digit when a six is added to correct a forbidden sum detected in the shift register.

Each carry signal gated by a TL1' pulse through the AND-gate 353 sets a buffer flip-flop 354. A TL3' pulse then gates the buffer output through an AND-gate 355 to set a carry flip-flop 356. Afterwards, a TL4 pulse resets the buffer flip-flop 354 and the following TL2 pulse resets the carry flip-flop 356 to clear the carry signal.

If the sum of two digits is sixteen, seventeen or eighteen, only part of the forbidden sum is stored in the shift register, the other part being a carry propagated during an IC4 interval when the most significant bits of the addend and augend are added in the first binary adder 330. The part that is stored in the shift register will be equal to either zero, one or two depending upon whether the sum is sixteen, seventeen or eighteen. None of those parts appear as forbidden sums; instead, they appear as proper binary-coded decimal digits. Therefore, the decoding AND-gate 341 will not initiate the addition of six necessary to correct the second part of a forbidden sum stored in the shift register. However, the forbidden sum will nevertheless be automatically corrected because the carry propagated by the addition of the most significant bits in the first binary adder 330 is gated from the carry flip-flop 335 through the AND-gate 343 by a TL2' pulse during the next IC1' interval to initiate the addition of six in the second binary adder 350. Correction of each of the forbidden sums sixteen, seventeen and eighteen is then accomplished by the addition of six to the part stored in the shift register in order to obtain the sum of six, seven and eight, respectively. The other part of the correcting process, namely the propagation of a carry to the next higher decimal order is accomplished by adding the carry signal output of the flip-flop 355 to the first bit of the digit in the next higher order.

BUFFER SECTION

As noted hereinbefore with reference to FIG. 1, data is accumulated in the accumulator section until a shear command is received. During a following complete half drum cycle, all of the data is transferred to a drum buffer 14 where it is stored until it is needed by the printer 16 for the preparation of a permanent record.

Drum buffer

The manner in which the drum buffer is implemented is illustrated in FIG. 1. It consists of a plurality of sectors arranged in pairs around the drum 18 on a track 370 in the same manner as the accumulator sectors on the track 302. When the transfer flip-flop 319 in the transfer switch 12 is set by the coincidence of a shear signal and an IL3' pulse at the AND-gate 324, the AND-gate 316 is disabled. The AND-gate 325 is then enabled to transmit the data from the adder 311 to the buffer track 370 during the next half cycle, after which the flip-flop 319 is reset by an IL1 pulse and the accumulation of new data from the next coil inspected begins in the accumulating section.

Each bit of data from the AND-gate 325 is gated by a TL1' pulse through an AND-gate 371 to a write amplifier 372 and its associated recording transducer 373. Since the transfer of data will always start at the beginning of a half drum cycle, it is completed in one half of a drum cycle. During the next half drum cycle, the transferred data recorded on one half of the buffer track 370 is read by a transducer 374 and amplifier 375.

Each bit of data read is stored in a buffer flip-flop 376 from a time prior to a TL1' pulse until a TL2 pulse resets it. The complement of each bit stored in the buffer flip-flop is transmitted through an AND-gate 377 which is connected to an output terminal 378 of the flip-flop 376 and enabled by the true side of the flip-flop 319 which has been reset by an IL1 pulse at the beginning of the next cycle. The output signals from the AND-gate 377 are transmitted through an OR-gate 379 to the AND-gate 371 and gated by TL1' pulses to the write amplifier 372. Once the accumulated data has been transferred to the buffer track 370, the accumulation of data on the track 312 may be resumed while data in the buffer track 370 is printed out.

Data print control

The function of the data print control circuit illustrated in FIG. 1a is to present the data in the drum buffer (FIG. 1) to a printer 16 in serial fashion. In order to identify particular digits, reference will be made to certain accumulators even though the data to be printed has been transferred to the drum buffer. Thus, a particular digit will be identified by the accumulator from which it has been transferred.

In printing data from the drum, the most significant digit of the sixth accumulator is printed first followed by the less significant digits, in order, until all four digits have been printed. This process is then repeated for the fifth, fourth, third, second and first accumulator, in order. All of the data is printed on a sheet of paper from left to right on a single line so that the most significant digit of each accumulator will appear on the left. The data may be identified by its relative position in the line. Vertical lines may be provided on the sheet at intervals of four spaces to separate the data. When the least significant digit of the first accumulator has been printed, the printer is turned off and the print control circuit is reset to its initial condition.

The presentation of data to the printer 16 is controlled by an AND-gate 401 which, when enabled, transmits TL2' pulses to the shift input terminal of a four-bit shift register 402, the serial input terminals of which are connected to the output terminal 378 of the buffer flip-flop 376 in the drum buffer (FIG. 1). The AND-gate 401 transmits four successive TL2' pulses to the shift register each time a digit to be printed is read from the buffer into the shift register.

The signal at the terminal 378 is the complement of a given bit stored in the buffer flip-flop 376. Accordingly, the terminal 378 is connected directly to the false input terminal of the shift register 402 and is coupled by an inverter 403 to its true input terminal. The function of the shift register is to convert each four-bit digit to be printed from time sequential information to static parallel information.

Each static four-bit digit is transmitted in parallel from the shift register 402 to the printer by a network 404 which may include a code converter if one is necessary in order to operate the printer 16. In the present embodiment, it is assumed that the printer is electronically operated with the 8, 4, 2, 1 code employed throughout for the binary-coded decimal digits. Therefore, the network 404 transmits each bit of a given digit to the printer through separate parallel channels, each channel including a two-input AND-gate. One input terminal of each AND-gate is connected to an output terminal 405 of the printer 16. A cam-actuated switch delivers a +6 volt signal to the terminal 405 when the printer has completed printing a digit and is in its position of rest. When that +6 volt signal is present, the gated transmitting network 404 translates the signals of the next digit read out to the printer.

The network 404 is provided with a fifth channel which also includes a two-input AND-gate having one input terminal connected to the false output terminal of a zero-suppress flip-flop 406 and the other input terminal connected to the terminal 405. The function of that flip-flop is to provide a fifth bit to be translated to the printer when a digit is to be printed. That bit is normally a bit 0 which may always be ignored while printing any digit. However, if the flip-flop 406 has been set to insert a bit 1 and the digit to be printed is the binary code 0000 for the digit zero, the bit 1 inserted provides the binary-coded word 00001, which is a coded instruction to be used for causing the printer to advance one space without printing, thereby suppressing a zero. In the present embodiment, all zeroes which occur before the first non-zero digit of the data to be printed from a given accumulator are suppressed.

Signals from the shear and print command source 12 (FIG. 1) initiate the process of printing the accumulated data. For simplicity, the shear command source is illustrated in FIG. 1a as a switch 410 which is momentarily closed to set a flip-flop 411 and thereby transmit a +6 volt SHEAR signal to the output terminal 323. That signal actuates the transfer switch 13 (FIG. 1) to cause the accumulated data to be transferred to the drum buffer as described hereinbefore and to initially set the zero-suppress flip-flop 406 by a signal XL' transmitted from the false side of the flip-flop 319 (FIG. 1) through an inverter 407.

The process of transferring data to the drum buffer requires at most one drum revolution cycle which may be assumed to be about 33⅓ milliseconds in the present embodiment. Accordingly, the automatic printing of data from the buffer drum may begin almost immediately. However, provision is made for first manually printing such information as the coil number and the customer's order number.

Momentarily closing the switch 410 also sets a flip-flop 412 and resets a flip-flop 413. The function of the flip-flop 412 is to turn on the printer. Data may then be manually printed. The function of the flip-flop 413 is to reset the flip-flop 412 when the automatic printing of the drum data is complete in order to turn the printer off.

When the manual printing has been completed, a switch 414 is momentarily closed to enable an AND-gate 415. The next IL1' pulse is then transmitted through the enabled AND-gate to reset the flip-flop 411 and initiate the automatic printing of the drum data.

Before the flip-flop 411 is reset, however, an IL1' pulse is gated through an AND-gate 421 to reset a flip-flop 422 previously set upon the completion of the automatic printing of drum data pertaining to the last coil sheared from the line. The function of that flip-flop is to enable an AND-gate 423 when it is set after the last digit to be printed has been read out of the drum buffer into the shift register 402. When the printing of the last digit has been completed and the cam-actuated switch produces a +6 volt signal at terminal 405, the AND-gate 423 transmits a signal to set the flip-flop 413 which in turn resets the flip-flop 412 and turns the printer off.

The SHEAR signal also enables an AND-gate 424 which transmits an IL3' pulse to a flip-flop 425 which had been set upon the completion of the last printing cycle by a signal transmitted through an AND-gate 426. The function of the AND-gate 426 is to detect when the last digit to be printed has been read into the shift register 402. That digit is the first or least significant digit of the first accumulator. When the flip-flop 425 is set, a print-complete signal PC' is transmitted to one of three input terminals of an AND-gate 427 via a lead not shown.

The function of the AND-gate 427 is to transmit an IL2' pulse to the set input terminal of the flip-flop 422. However, a fetch-digit control signal FD' is required at the third input terminal of that AND-gate before an IL2' pulse may be transmitted to set the flip-flop 422 and initiate the steps necessary to turn the printer off. The manner in which the fetch-digit signal is produced will be described as the description of a printing cycle progresses.

A third AND-gate 430 is also enabled by the SHEAR signal at terminal 323 to transmit a TL4' pulse to the set input terminal of the first stage of a binary counter 431, thereby incrementing it to one. TL3' pulses are transmitted through an AND-gate 432 which is also enabled through an OR-gate 433 by the true output signal of the set flip-flop 411, thereby initially resetting the counter 431 to zero. Acordingly, as long as the flip-flop 411 is set, the first stage is continually set and reset.

The next IL1' pulse to occur after the switch 414 is closed resets the flip-flop 411 and disables the AND-gates 421, 424, 430 and 432. The flip-flops 422 and 425 remain reset and the first stage of the binary counter 431 remains set since the last TL4' pulse in a given half drum cycle sets it, and the next resetting TL3' pulse is not transmitted to the AND-gate 432 until after the IL1' pulse has reset the flip-flop 411 and disabled the AND-gate 432. In that manner, an extra bit 1 is inserted in the binary counter 431 when the automatic printing process is begun by the coincidence of an IL1' pulse and the momentary closure of the switch 414.

That bit is denominated an extra bit because the counter is normally advanced by TL2' pulses which occur during IC4' intervals in order to locate a given digit to be counted. The function of that extra bit is to permit the counter to address the digit stored in the 122nd sector by reaching a count of 122 while the 121st digit sector is being scanned, assuming that there are 122 digit sectors on each half of the buffer track 370 (FIG. 1) and not the more limited number of sectors illustrated in the foregoing chart.

The function of the counter 431 itself will now be more fully described. It is to be recalled that each digit sector is capable of storing a four-bit binary-coded digit and it is assumed that digits are actually stored in only the last twenty-four sectors. The counter will locate the first digit to be read out of the 122nd sector by counting to 122. Since an extra bit was inserted initially, the counter will reach the count of 122 when the 121st sector is being scanned. An AND-gate 435 is then enabled by output signals from the counter. A subsequent TL4' pulse is transmitted through the enabled AND-gate 435 to the flip-flop 436, thereby setting it to initiate the generation of a readout control signal if the cam-actuated switch in the printer is transmitting a +6 volt signal at terminal 405. If it is, the digit in the 122nd sector is read into the shift register 402 and printed in a manner to be more fully described; if not, the digit in the 122nd sector is not read into the shift register for printing. In either event, the counter is reset to zero when the first cell of the 122nd sector is scanned.

If the digit in the 122nd sector is not printed, the counter will begin counting again as that sector is being scanned. Accordingly, the count of 122 will be reached again while the 121st sector on the other side of the buffer track is being scanned. In that manner, the 122nd sector of alternate halves of the buffer track will continually be addressed until it is read out and printed.

After the digit in the 122nd sector is printed, the counter must address the 121st sector by again reaching the count of 122. To acomplish that, another extra bit is inserted while the 122nd sector is being scanned. Thereafter, as the normal counting procedure is resumed while the 122nd sector is still being scanned, the counter will be advanced until it reaches the count of 122 during the 120th sector. If a +6 volt signal is then present at terminal 405, the 121st digit is read out, a third extra bit is inserted and the counter is subsequently advanced to 122 while the 119th sector is being scanned in order to read out the 120th digit.

In that manner, each digit stored is addressed in inverse sequence, at a rate determined by the printer, by always counting 121 sectors relative to the last one read out and printed. The processing of the address is continued by inserting an extra bit 1 each time a digit is printed until all of the twenty-four digits stored have been printed. When the last digit stored has been printed, the address will again be precessed to the next digit sector, but since a digit is not stored in that sector, the completion of the automatic printing process is detected and the printer is turned off.

The manner in which the foregoing is accomplished will now be described in detail. The counter 431 is driven by TL2' pulses transmitted through an AND-gate 440 when enabling IC4 pulses are transmitted to a second input terminal of the AND-gate 440 through an OR-gate 441. An inverter 442 couples the AND-gate 40 to the input terminal of the counter 431 in order to provide positive-going pulses to the steering circuit of the first binary stage of the counter.

Since the first stage of the counter was set by a TL4' pulse, the first TL2' pulse gated by the first IC4 signal advances the count to two. Referring briefly to FIG. 2, the following may be readily understood; (1) that the first TL2' pulse gated to the counter is the fifth TL2' pulse in the half drum cycle following the IL1 pulse which resets the flip-flop 411 to begin the automatic printing process; (2) that the second, third, fourth and fifth TL1' pulses mark the cells of the first four-bit digit memory sector on the buffer track; and (3) that the first TL2' pulse gated to the counter occurs at the end of the first digit location. Accordingly, the counter is advanced to two approximately twenty-five microseconds before the first bit of the second digit is scanned. Each TL2' pulse gated by subsequent IC4 signals advances the counter until the count of 122 is reached twenty-five microseconds before the first cell of the 122nd digit sector is scanned.

When the count of 122 is reached, the AND-gate 435 is enabled. Ten microseconds later, a TL4' pulse is transmitted through the enabled AND-gate 435 to set the flip-flop 436, thereby enabling an AND-gate 445. An IC1' pulse is then transmitted to the AND-gate 432 via the OR-gate 433 to gate the next TL3' pulse to the reset input terminal of the counter 431. In that manner, the counter is reset while the first binary cell of the 122nd digit is being scanned.

If the printer had not been free to print a digit at the beginning of the half drum cycle during which the 122nd digit was located, a +6 volt signal would not have been transmitted from the terminal 405. Therefore, an IL2' pulse would not have been gated to a flip-flop 446 through an AND-gate 447 and the flip-flop 446 would not have been set to produce a fetch-digit control signal FD'. Accordingly, an AND-gate 448 would not have been enabled and a read-out control signal would not have been transmitted through an inverter 449 to the read-out control AND-gate 401 in order to gate four TL2' pulses while the four binary cells of the 122nd sector are being scanned.

Under those conditions, the 122nd digit is not read into the shift register 402 and the binary counter, after first being reset by a TL3' pulse, continues to count all subsequent TL2' pulses which occur during IC4 intervals. Upon again reaching the count of 122, the counter again locates the 122nd digit in the same manner as before. If the fetch-digit signal FD' is then present, the four-bits of the 122nd digit are read from the other half of the drum. Assuming that a fetch-digit signal FD' is present when the flip-flop 436 is set, the AND-gate 448 transmits a read-out control signal to the AND-gate 401.

It should be noted that the flip-flop 425 remains reset because the only way in which it can be set is by having both flip-flops 436 and 450 set at the same time to enable an AND-gate 426. That cannot occur until after the least significant digit of the first accumulator in the 99th digit location has been printed. At that time the address will precess to the 98th digit location and the count of 122 will be reached when the last cell of the 97th digit is being scanned. A TL4' pulse transmitted during that period sets the flip-flop 436. By then, the flip-flop 450 has been set by an IL1 pulse but not reset because the first T-MARK pulse T1 does not occur for at least five microseconds. Accordingly, the AND-gate 426 transmits a signal to the flip-flop 425 and resets it, thereby disabling the AND-gate 448. However, while locating the 122nd digit, the print-complete circuit does not function because the flip-flop 450 is reset and the flip-flop 425 is not set. Accordingly, a read-out control signal is transmitted to the AND-gate 401 to enable it to transmit four successive TL2' pulses which shift the four-bit digit from the 122nd location into the shift register 402.

The zero-suppress flip-flop 406, initially set by an XL' pulse, is reset by the first nonzero digit of the sixth accumulator in a manner to be described. It is set again by the first digit to be printed from each subsequent accumulator. For instance, assume that the 118th digit sector is addressed. The read-out control signal enables an AND-gate 455 and an AND-gate 456. The T-MARK' pulse T9 which now occurs four cell periods earlier with respect to the stored data, is transmitted through the enabled AND-gate 455 and the flip-flop 457 is set. Its false output signal transmitted through the enabled AND-gate 456 sets the zero-suppress flip-flop 406, the true output signal of which resets the flip-flop 457.

The true output signals from each stage of the shift register are connected to input terminals of an OR-gate 458. If each bit of the four-bit digit stored in the shift register is a bit 0, all of the signals to the OR-gate are +6 volt signals. Accordingly, its output terminal remains at 0 volts and an AND-gate 459 remains disabled.

A signal transmitted by an AND-gate 460 sets a flip-flop 461 which transmits a print signal to the printer and the AND-gate 459. However, because the AND-gate 459 is not enabled, a signal is not transmitted to reset the flip-flop 406. Accordingly, the flip-flop 406 inserts a bit 1 into the network 404 and a space or blank is provided on the record instead of a zero to suppress the printing of a zero.

The AND-gate 460 does not transmit a signal to the print control flip-flop 461 until after a flip-flop 462 is set and the flip-flop 436 is reset. The former is set by the first TL2' pulse gated through the AND-gate 401. The latter is reset by a TL3' pulse transmitted through an AND-gate 463 during the IC4' interval, which is during the next timing level period following the TL2' pulse which shifts the fourth bit of the digit to be printed into the shift register.

In the interim, the false output signal from the set flip-flop 436 enables the AND-gate 445 to transmit an IC1' pulse via the OR-gate 433 to the AND-gate 432. A TL3' pulse is thereby gated to the reset input terminal of the counter 431 and the counter is reset.

When the flip-flop 436 is reset, the read-out control signal is removed, and AND-gate 401 is disabled and no further TL2' pulses are transmitted to the shift register 402. Thus, the flip-flop 436 is set to provide a read-out control signal if the fetch-digit signal FD' is present from the time of a TL4' pulse of the IC4 interval preceding the location of the digit to be printed out until the time TL3' pulse of the IC4' interval of the digit read out for printing. Referring again to the fourth and fifth graphs of FIG. 2, it may be readily seen that only four TL2' pulses occur while the flip-flop 436 is set.

Before the flip-flop 436 is reset, the read-out control signal gates an IC3' signal through an AND-gate 464. That signal is transmitted to the AND-gate 440 through the OR-gate 441 to gate a TL2' pulse to the binary counter 431, thereby inserting an extra bit which causes the counter to locate the next digit to be printed out. Subsequent TL2' pulses gated by IC4 signals via the OR-gate 441 advance the counter to 122. Due to the extra bit inserted while the 121st digit sector was being scanned and the TL2' pulse counted while the 122nd digit sector was being read out into the shaft register, the counter reaches the count of 122 while the 120th digit sector on the other side of the buffer track 370 (FIG. 1) is being scanned.

Even the fastest printer available could not complete the printing of the first digit by the time the second digit is located on the other side of the buffer track. Accordingly, the counter is reset several times by TL3' pulses during an IC1' interval of the 121st digit sector and again advanced to 122 by TL2' pulses. However, since a read-out signal is not being transmitted to the AND-gate 464 each time the count of 122 is reached, extra TL2' pulses are not inserted again. Accordingly, the counter continually addresses the 121st digit until a fetch-digit control FD' signal is present.

When the printing of the first digit has been completed, a +6 volt signal is transmitted from the terminal 405 to a one-shot circuit 466 which in turn resets the print control flip-flop 461 and the flip-flop 462. The latter resets the shift register 402 through an inverter 463.

The +6 volt signal at the terminal 405 also enables the AND-gate 447 as described hereinbefore. The next IL2' pulse, therefore, sets the flip-flop 446 via the AND-gate 447. Accordingly, when the 121st digit is again located, a read-out control signal is transmitted to the AND-gate 401 and the 121st digit is read out for printing.

If the 121st digit is not a zero, the AND-gate 459 is enabled and the print signal, generated in the same manner as before, resets the flip-flop 406. The nonzero digit is then printed. After the printing of that digit is complete, the cycle is repeated for the next two digits of the sixth accumulator, both of which are printed whether or not they are zeroes because the zero-suppress flip-flop 406 has been reset.

The drum data from each of the remaining accumulators is printed in a similar manner. For instance, when the most significant digit of the data from the fifth accumulator is located and read into the shift register 402, the T-MARK' pulse T9 which now occurs while the first cell of that digit is being scanned, sets the zero-suppress flip-flop 406. The first nonzero digit to be read into the shift register thereafter resets it and all subsequent digits from that accumulator are printed.

After the least significant digit of the first accumulator (the 99th digit), has been located and read into the shift register 402, the counter will locate the 98th digit by setting the flip-flop 436 while the 97th digit is being addressed. The AND-gate 426 then transmits a signal for the first time because, as described hereinbefore, the flip-flop 450 set by the last IL1 pulse has not been reset by a T1 pulse. Accordingly, the flip-flop 425 transmits a print complete signal PC' to the AND-gate 427.

When the printing of the least significant digit of the first accumulator has been completed, a fetch-digit signal FD' is produced. However, a read-out signal is not produced again because the AND-gate 448 is no longer enabled since the flip-flop 425 has been set.

The fetch-digit signal FD' is transmitted to an input terminal of the AND-gate 427 by a lead not shown.

When the printing of the least significant digit of the With both the PC' and FD' signals present, the AND-gate 427 is enabled and the next IL2' pulse is transmitted to the flip-flop 422. The AND-gate 423 is enabled by a digit-needed signal at the terminal 405. Accordingly, when the flip-flop 422 is set by an IL2' pulse via the AND-gate 427, the flip-flop 413 is set, the flip-flop 412 is reset and the printer is turned off, thereby completing one full printing cycle for all of the data pertaining to a given coil.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a system for storing a plurality of data items in a corresponding plurality of memory locations accessible in a predetermined order, apparatus for transferring the data items in sequence from the memory locations to a utilization means in the inverse order comprising: reading means for periodically scanning the memory locations in the predetermined order, counter means for storing a count, means for modifying the count in said counter means by a predetermined quantity for each memory location scanned by said reading means, transfer means responsive to a predetermined count in said counter means for transferring to the utilization means the data item in the memory location having a predetermined relationship with said reading means, and means responsive to the predetermined count in said counter means for causing the count in said counter means to equal the predetermined quantity, whereby said transfer means causes the data item in the next preceding memory location to be transferred to the utilization means during a subsequent periodic scanning of the memory locations by said reading means.

2. In a system for storing a plurality of data items in a corresponding plurality of memory locations accessible in a predetermined order, apparatus for transferring the data items in sequence from the memory locations to a utilization means in the inverse order comprising: transducer means for periodically scanning the memory locations in the predetermined order and for reading the data item from each memory location as it is scanned, counter means for storing a count, means connected to said transducer means for modifying the count in said counter means by a predetermined quantity for each memory location scanned by said transducer means, transfer means responsive to a predetermined count in said counter means for transferring from said transducer means to the utilization means the data item in the memory location having a predetermined relationship with said transducer means, and means responsive to the predetermined count in said counter means for causing the count in said counter means to equal the predetermined quantity, whereby said transfer means in response to the count in said counter means transfers the data item in the next preceding memory location from said transducer means to the utilization means during a subsequent periodic scanning of the memory locations by said transducer means.

3. In a system for storing data items in $n$ storage locations accessible in a predetermined order, apparatus for transferring the data items in sequence from the memory locations to a utilization means in the inverse order comprising: reading means for periodically scanning the storage locations in the predetermined order, counter means for storing a count, incrementing means for incrementing the count in said counter means by one for each storage location scanned by said reading means, transfer means responsive to a count of $n$ in said counter means for transferring to the utilization means the data item in the storage location having a predetermined relationship to said reading means, and means responsive to the count of $n$ in said counter means and to the transfer of a data item to said utilization means for reducing the count in said counter means to a count of one before said counter means is incremented by said incrementing means while said reading means scans the next storage location, whereby said counter means causes said transfer means to transfer the data item in the next preceding storage location to the utilization means during a subsequent periodic scanning of the storage locations by said reading means.

4. In a system for storing data items in $n$ memory locations accessible in a predetermined order, apparatus for transferring the data items in sequence from the memory locations to a utilization means in the inverse order comprising: reading means for periodically scanning the memory locations in the predetermined order, counter means for initially storing a count of one, incrementing means for incrementing the count in said counter means by one for each memory location scanned by said reading means, transfer means responsive to a count of $n$ in said counter means for transferring to the utilization means the data item in the next memory location to be scanned by said reading means, means responsive to the count of $n$ in said counter means for reducing the count in said counter means to a count of one before said counter means is incremented by said incrementing means while said reading means scans the next memory location in the predetermined order, whereby said counter means causes said transfer means to transfer the data item in the next preceding memory location to the utilization means during a subsequent periodic scanning of the memory locations by said reading means.

5. In a system for storing data items in a plurality of storage locations accessible in a predetermined order, apparatus for transferring the data items in sequence from the memory locations to a utilization means in the inverse order comprising: reading means for periodically scanning the storage locations in the predetermined order, counter means for storing a count, incrementing means for incrementing the count in said counter means by one for each storage location scanned by said reading means, transfer means responsive to a predetermined count in said counter means for normally transferring to the utilization means the data item in the storage location having a predetermined relationship to said reading means, means responsive to the predetermined count in said counter means and to the transfer of a data item to the utilization means for reducing the count in said counter means to a count of one before said counter means is incremented by said incrementing means while said reading means scans the next storage location, and means responsive to the predetermined count in said counter means and to the absence of a transfer of a data item to the utilization means for reducing the count in said counter means to a count of zero before said counter means is incremented by said incrementing means while said reading means scans the next storage location.

6. In a system for sequentially operating on data stored in $n$ memory locations accessible in a predetermined cyclical order, apparatus for sequentially reading out stored data in inverse order comprising: a transducer for reading said data from said memory locations in a predetermined cyclical order, means for counting said memory locations as they are read during a given cycle, means for initially incrementing said counting means to the count of one, decoding means for detecting when said counting means reaches the count of $n$, translating means coupled to said transducer and decoding means for transmitting data read from the next memory location in response to decoding the count of $n$, means for resetting said counting means before data from the next memory location is read and counted, and means for further incrementing said counting means to the count of two as data is read out of the next memory location, whereby the counting means causes data in the next preceding memory location to be read out during a subsequent reading cycle.

7. In a buffer system for storing $n$ binary-coded digits in a cyclical memory system until a means for preparing a permanent record is ready to accept the digits, one at a time in inverse order, the combination comprising: a transducer for scanning said digits; means for counting said digits as they are scanned in sequence, means for initially incrementing said counting means to the count of one, decoding means for detecting when said counting means reaches the count of $n$, means for reading out the next digit in response to the coincidence of decoding the count of $n$ and receiving a signal from said means for preparing a permanent record indicating that it is ready to accept the next digit, means responsive to a count of $n$ in said counting means for resetting said counting means before said next digit is read out and counted, and means responsive to acceptance of a digit from said memory system by said means for preparing a permanent record for further incrementing said counting means to the count of two with another pulse when said next digit is read out, whereby the counting means will address the next preceding digit during the next memory cycle by again counting $n$ digits if a digit is not read out during the current memory cycle, and will continue to address the next digit during subsequent memory cycles by counting $n$ digits until it is read out, at which time the counter is incremented to the count of two with another pulse to address the next preceding digit during the following memory cycles until the next preceding digit is read out.

8. In a system for storing a plurality of data items in a corresponding plurality of memory locations accessible in sequence in a predetermined order, control apparatus for controlling the transfer of data items in sequence from the memory locations to a utilization means in the inverse order comprising: reading means for periodically scanning the memory locations in sequence in the predetermined order, counter means for storing a count, means for changing the count in said counter means by a predetermined quantity for each memory location scanned by said reading means, transfer means responsive to a predetermined count in said counter means for transferring to the utilization means the data item in the memory location having a predetermined relationship with said reading means, and means responsive to the transfer of a data item from a memory location to the utilization means for causing said change means to provide an extra change in the count in said counter means, whereby the control apparatus causes the data item in the next preceding memory location to be transferred to the utilization means during the next periodic scanning of a memory location by said reading means.

9. In a system for storing a plurality of data items in a corresponding plurality of memory locations accessible in sequence in a predetermined order, control apparatus for controlling the sequential transfer of data items from the memory locations to a utilization means in the inverse order comprising: reading means for periodically scanning the memory locations in the predetermined order, counter means for counting the number of memory locations scanned by said reading means commencing with an initial count, transfer means responsive to a predetermined count in said counter means for transferring to the utilization means the data item in the memory location having a predetermined relationship with said reading means, means responsive to the predetermined count in said counter means for changing the count in said counter means to the initial count, and means responsive to the transfer of a data item to the utilization means for causing said counter means to record an extra count, whereby the control apparatus causes the data item in the next preceding memory location to be transferred to the utilization means during a subsequent periodic scanning of the memory locations by said reading means.

10. In a system for storing a plurality of data items in a corresponding plurality of memory locations accessible in sequence in a predetermined order, control apparatus for controlling the sequential transfer of data items from the memory locations to a utilization means in the inverse order comprising: reading means for periodically scanning the memory locations in the predetermined order, counter means for counting the number of memory locations scanned by said reading means commencing with an initial count, signal means connected to the utilization means for providing a signal when the utilization means is ready to receive a data item, transfer means responsive to a predetermined count in said counter means and to the signal provided by said signal means for transferring to the utilization means the data item in the memory location having a predetermined relationship with said reading means, means responsive to the predetermined count in said counter means for changing the count in said counter means to the initial count, and means responsive to the transfer of a data item to the utilization means for causing said counter means to record an extra count, whereby the control apparatus causes the data items in successively preceding memory locations to be transferred to the utilization means as the utilization means accepts data items during subsequent periodic scans of the memory locations by said reading means.

References Cited

UNITED STATES PATENTS

| | | | |
|---|---|---|---|
| 2,853,696 | 9/1958 | Mendelson | 340—173 |
| 2,983,904 | 5/1961 | Moore | 340—172.5 |
| 3,069,666 | 12/1962 | Austin | 340—174.1 |

BERNARD KONICK, *Primary Examiner.*

TERRELL W. FEARS, *Examiner.*